United States Patent [19]

Shing

[11] Patent Number: 5,240,050
[45] Date of Patent: Aug. 31, 1993

[54] METHOD FOR FABRICATING A GLUING PLANK

[76] Inventor: Wang F. Shing, P.O. Box 82-144, Taipei, Taiwan

[21] Appl. No.: 888,351

[22] Filed: May 21, 1992

[51] Int. Cl.$^5$ .......................... B27D 1/00; B27B 1/00
[52] U.S. Cl. ..................................... 144/350; 144/345; 144/348; 144/352; 144/356; 144/364; 144/380; 144/367; 156/266; 156/304.1
[58] Field of Search .................. 156/91, 264, 265, 266, 156/267, 299, 300, 304.1; 144/3 R, 345, 348, 350, 351, 352, 356, 364, 367, 380

[56] References Cited

U.S. PATENT DOCUMENTS

| | | | |
|---|---|---|---|
| 2,344,722 | 3/1944 | Pasquier | 144/348 |
| 2,544,935 | 3/1951 | Orner | 144/350 |
| 2,878,844 | 3/1959 | Andersson | 144/350 |
| 3,686,061 | 8/1972 | Brown et al. | 144/352 |
| 3,878,017 | 4/1975 | Etzold | 144/348 |
| 3,969,558 | 7/1976 | Sadashige | 144/350 |
| 5,050,653 | 9/1991 | Brown | 141/350 |
| 5,069,977 | 12/1991 | Goenner | 144/352 |

Primary Examiner—W. Donald Bray
Attorney, Agent, or Firm—Alfred Lei

[57] ABSTRACT

This invention relates to a method for fabricating a gluing plank and in particular to one including steps of severing timber into boards in which those without defects are used as surface board and bottom board while those with defects are used as intermediate board in transverse and longitudinal directions alternately, applying adhesive agent on the boards, gluing the surface board, the bottom board and the intermediate board together to form a plank, and cold pressing and hot pressing the plank.

1 Claim, 2 Drawing Sheets

METHOD FOR FABRICATING A GLUING PLANK

BACKGROUND OF THE INVENTION

It is found that the prior art plywood is simply a manufactured board composed of an odd number of thin sheets of wood glued together under pressure with grains of the successive layers at right angles. Laminated wood differs from plywood in that the grains of its sheets are parallel. Plywood is noted for its strength, durability, lightness, rigidity, and resistance to splitting and warping. However, less than 50% of the timber can be used for manufacturing plywood hence wasting a lot of wood.

Therefore, it is an object of the present invention to provide a method for fabricating a gluing plank which may obviate and mitigate the above-mentioned drawbacks.

SUMMARY OF THE INVENTION

This invention relates to a method for fabricating a gluing plank.

It is the primary object of the present invention to provide a method for fabricating a gluing plank which may fully utilize the timber.

It is another object of the present invention to provide a method for fabricating a gluing plank which will not be distorted even exposed to sunlight for a long period of time.

It is still another object of the present invention to provide a method for fabricating a gluing plank which may have the same color and wood grain as the surface even after being severed.

It is still another object of the present invention to provide a method for fabricating a gluing plank which is easy to be carried out.

It is a further object of the present invention to provide a method for fabricating a gluing plank which is practical in use.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
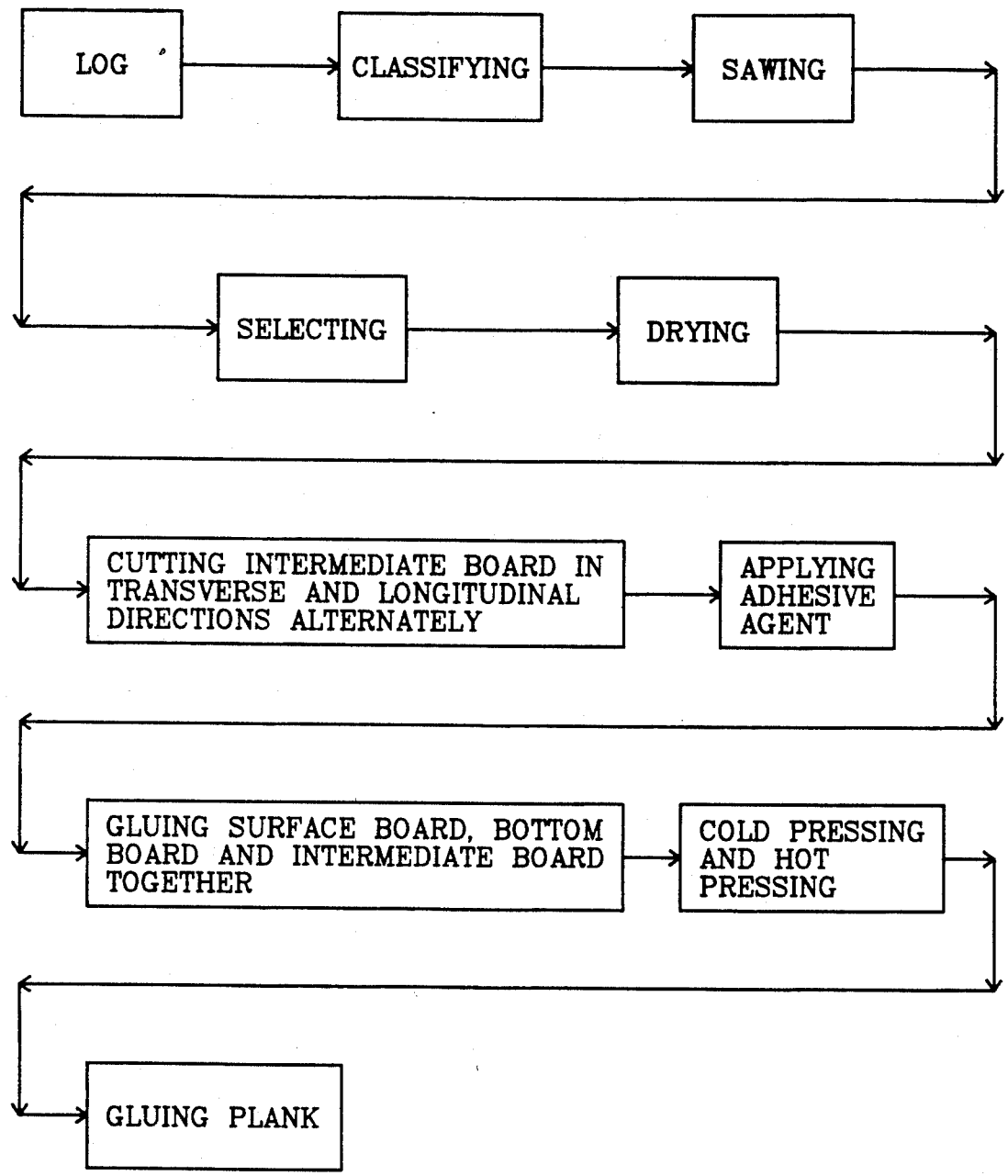
FIG. 1 is a flow chart showing the method for fabricating a gluing plank with longitudinal wood grains according to the present invention.
Figure 2:
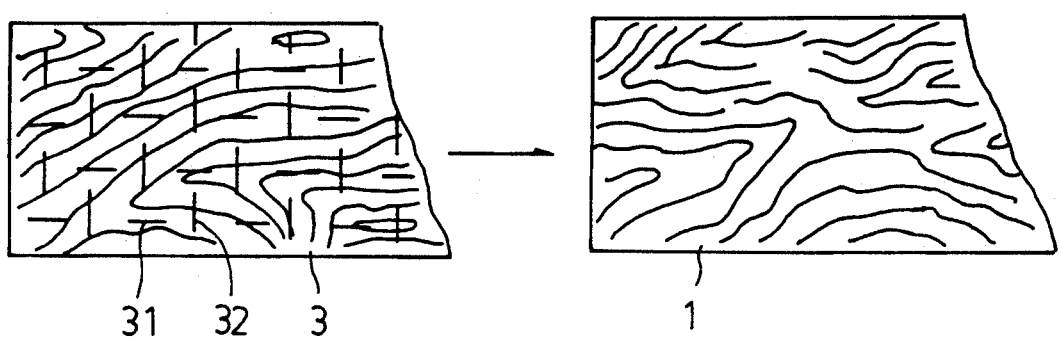
FIG. 2 shows the way to carry out the method for fabricating a gluing plank according to the present invention.
Figure 2:
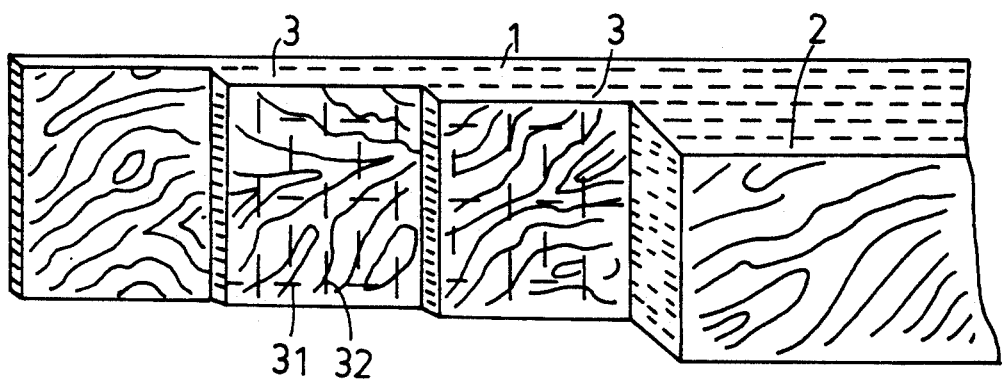

With reference to the drawings, the timber is first severed into a number of boards in which those without defects are used as the surface board 1 and the bottom board 2 while those with defects as the intermediate boards 3. The boards are first classified according to the color and material and then dried. Thereafter, the the intermediate board 3 is severed in transverse direction and longitudinal direction alternately (see FIG. 2) so that the intermediate board 3 is possessed of a plurality of transverse cutting lines 31 and longitudinal cutting lines 32. Then the intermediate board 3 is applied with adhesive agent and engaged between the surface board 1 and the bottom board 2. However, it should be noted that the fibers of the surface board 1, the bottom board 2 and the intermediate board 3 lie on the same direction. Then, the boards are treated with cold pressing and hot pressing to form the gluing plank according to the present invention. Further, a number of the intermediate board 3 may be sandwiched between the surface board 1 and the bottom board 2 as required.

Hence, as the surface board 1, the bottom board 2 and the intermediate board 3 are made of the same timber so that even if the board accroding to the present invention is severed, the surface being cut will have the same color and wood grain as the surface board 1 thereby providing convenience for the user.

As the intermediate board 3 is formed by transverse cutting and longitudinal cutting alternately, the fiber will not be completely cut off. In the meantime, the stress in the fiber of the board will be released thereby preventing the board to be distorted when exposed to sunlight for a long period of time. In addition, the adhesive agent will permeate into the intermediate board 3 through the cutting lines 31 and 32 hence reinforcing the strength of the board.

Although the present invention has been described with a certain degree of particularity, it is understood that the present disclosure is made by way of example only and that numerous changes in the detail of construction and the combination and arrangment of parts may be resorted to without departing from the spirit and scope of the invention as hereinafter claimed.

I claim:

1. A method for fabricating a gluing plank comprising steps of:
    severing timber into boards without defects and with defects, the boards without defects being used as surface board and bottom board, the boards with defects being used as intermediate board;
    drying said boards;
    cutting said intermediate board in transverse and longitudinal directions alternately;
    applying adhesive agent on said boards;
    gluing said surface board, bottom board and intermediate board together to form a plank; and
    cold pressing and hot pressing said plank.

* * * * *